(12) United States Patent
Saitoh et al.

(10) Patent No.: US 10,613,262 B2
(45) Date of Patent: Apr. 7, 2020

(54) OPTICAL LAMINATE

(71) Applicant: FUJIFILM CORPORATION, Minato-ku, Tokyo (JP)

(72) Inventors: Yukito Saitoh, Kanagawa (JP); Daisuke Kashiwagi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/253,212

(22) Filed: Jan. 21, 2019

(65) Prior Publication Data
US 2019/0170919 A1 Jun. 6, 2019

Related U.S. Application Data

(63) Continuation of application No. PCT/JP2017/031036, filed on Aug. 29, 2017.

(30) Foreign Application Priority Data

Aug. 30, 2016 (JP) .................. 2016-167562
May 18, 2017 (JP) .................. 2017-099353

(51) Int. Cl.
*G02B 5/30* (2006.01)
*G02B 5/26* (2006.01)
*G02B 5/18* (2006.01)

(52) U.S. Cl.
CPC ............... *G02B 5/26* (2013.01); *G02B 5/18* (2013.01); *G02B 5/30* (2013.01); *G02B 5/3083* (2013.01)

(58) Field of Classification Search
CPC ..................................... G02B 5/26
See application file for complete search history.

(56) References Cited

U.S. PATENT DOCUMENTS

| | | | |
|---|---|---|---|
| 2003/0077421 A1 | 4/2003 | Ishizaki et al. |
| 2007/0188678 A1 | 8/2007 | Kim et al. |
| 2009/0104539 A1 | 4/2009 | Watanabe et al. |
| 2009/0128772 A1 | 5/2009 | Hoshino et al. |

(Continued)

FOREIGN PATENT DOCUMENTS

| | | |
|---|---|---|
| JP | 2003-131031 A | 5/2003 |
| JP | 2003-139942 A | 5/2003 |
| JP | 2007-98942 A | 4/2007 |

(Continued)

OTHER PUBLICATIONS

International Search Report issued in International Application No. PCT/JP2017/031036 dated Nov. 21, 2017.

(Continued)

*Primary Examiner* — Edmond C Lau
(74) *Attorney, Agent, or Firm* — Solaris Intellectual Property Group, PLLC

(57) ABSTRACT

An optical laminate includes a wavelength selective reflective element which is provided with a reflection layer selectively reflecting light in a specific reflection wavelength region, and an absolute phase adjustment layer which is provided on at least one surface side of the wavelength selective reflective element and has optical isotropy, and the absolute phase adjustment layer has an in-plane distribution of at least one of a refractive index or a film thickness, and thus has an in-plane distribution of an optical path length in a film thickness direction.

10 Claims, 8 Drawing Sheets

(56) References Cited

U.S. PATENT DOCUMENTS

2011/0199685 A1\* 8/2011 Ito .............................. B32B 3/30
359/589
2016/0154157 A1\* 6/2016 Cho ........................ G02B 1/11
359/489.07

FOREIGN PATENT DOCUMENTS

| JP | 2007-219527 A | 8/2007 |
| JP | 2007-279129 A | 10/2007 |
| JP | 2011-102843 A | 5/2011 |

OTHER PUBLICATIONS

Written Opinion of the ISA issued in International Application No. PCT/JP2017/031036 dated Nov. 21, 2017.
Kobashi et al "Planar optics with patterned chiral liquid crystals" Nature Photonics, Macmillan Publishers Limited, Apr. 11, 2016, pp. 1-5.
English language translation of the following: Office action dated Oct. 29, 2019 from the JPO in a Japanese patent application No. 2018-537317 corresponding to the instant patent application.

\* cited by examiner

OPTICAL LAMINATE

CROSS-REFERENCE TO RELATED APPLICATIONS

This application is a continuation application of International Application No. PCT/JP2017/031036, filed Aug. 29, 2017, the disclosure of which is incorporated herein by reference in its entirety. Further, this application claims priority from Japanese Patent Application No. 2016-167562, filed Aug. 30, 2016, and Japanese Patent Application No. 2017-099353, filed May 18, 2017, the disclosures of which are incorporated herein by reference in their entirety.

BACKGROUND OF THE INVENTION

1. Field of the Invention

The present invention relates to an optical laminate provided with a wavelength selective reflective element.

2. Description of the Related Art

Wavelength selective reflective elements selectively reflecting light in a specific wavelength region have been known.

A cholesteric liquid crystal which is a type of wavelength selective reflective element has a property of selectively reflecting specific circularly polarized light of a specific wavelength and transmitting other wavelengths and other circularly polarized light, and is used for a color filter or a brightness enhancement film of a display device.

In addition, a technology of using a cholesteric liquid crystal layer as an identification medium has also been known (JP2007-279129A, JP2011-102843A, etc.). JP2007-279129A and JP2011-102843A disclose an identification medium which is provided with: a cholesteric liquid crystal layer having a hologram layer including hologram images for left and right eyes; and a λ/2 plate provided to have a predetermined pattern on the cholesteric liquid crystal layer.

In "Planar optics with patterned chiral liquid crystal", Kobayashi et al., Nature Photonics, 2016. 66 (2016), it has been found that the phase of light which is reflected from a cholesteric liquid crystal changes depending on the phase of a helical structure, and it has been shown that the wavefront of the reflected light can be arbitrarily designed by spatially controlling the phase of the helical structure.

SUMMARY OF THE INVENTION

In "Planar optics with patterned chiral liquid crystal", Kobayashi et al., Nature Photonics, 2016. 66 (2016), a method of controlling the phase of a helical structure of a cholesteric liquid crystal by pattern alignment in steps of forming a cholesteric liquid crystal layer has been proposed. However, this method is difficult to apply in practical use since it is necessary to finely control the liquid crystal alignment direction. There is a high demand for an optical member in which a wavefront of reflected light, not just in a cholesteric liquid crystal layer, but in a wavelength selective reflective element can be arbitrarily designed.

The invention is contrived in view of the circumstances, and an object thereof is to provide an optical laminate which can be easily formed, and in which a wavefront of reflected light by a wavelength selective reflective element can be arbitrarily designed.

An optical laminate according to the embodiment of the invention, comprising: a wavelength selective reflective element which is provided with a reflection layer selectively reflecting light in a specific reflection wavelength region; and an absolute phase adjustment layer which is provided on at least one surface side of the wavelength selective reflective element and has optical isotropy, in which the absolute phase adjustment layer has an in-plane distribution of at least one of a refractive index or a film thickness, and thus has an in-plane distribution of an optical path length in a film thickness direction, and the optical laminate reflects light in the specific reflection wavelength region by the wavelength selective reflective element, of light incident from the absolute phase adjustment layer side, as reflected light having a wavefront different from a wavefront of the incident light.

In the optical laminate according to the embodiment of the invention, the reflection layer of the wavelength selective reflective element may be formed of a cholesteric liquid crystal layer.

In the optical laminate according to the embodiment of the invention, the reflection layer of the wavelength selective reflective element may be a dielectric multilayer film in which at least two layers having different refractive indices are alternately laminated in multiple layers.

In the optical laminate according to the embodiment of the invention, the in-plane distribution of the optical path length in the absolute phase adjustment layer may have a pattern in which the optical path length is changed stepwise.

In the optical laminate according to the embodiment of the invention, the in-plane distribution of the optical path length in the absolute phase adjustment layer may have a pattern in which the optical path length is gradually increased with an increase in distance from one point.

In the optical laminate according to the embodiment of the invention, the in-plane distribution of the optical path length in the absolute phase adjustment layer may have a pattern in which the optical path length is gradually reduced with an increase in distance from one point.

In the in-plane distribution of the optical path length in the absolute phase adjustment layer of the optical laminate according to the embodiment of the invention, any one of the above patterns or a combination of the patterns may be periodically repeated.

An optical laminate according to the embodiment of the invention includes a wavelength selective reflective element which is provided with a reflection layer selectively reflecting light in a specific reflection wavelength region, and an absolute phase adjustment layer which is provided on at least one surface side of the wavelength selective reflective element and has optical isotropy, and the absolute phase adjustment layer has an in-plane distribution of at least one of a refractive index or a film thickness, and thus has an in-plane distribution of an optical path length in a film thickness direction. Accordingly, the optical laminate can emit, of light incident from the absolute phase adjustment layer side, light in the specific reflection wavelength region by the wavelength selective reflective element as reflected light having a wavefront different from a wavefront of the incident light. That is, in a case where a uniform wavelength selective reflective element is provided with an absolute phase adjustment layer, a wavefront of reflected light can be controlled. The optical laminate according to the embodiment of the invention can be more simply formed and is more suitable for practical use than in a case where a fine pattern is formed on the wavelength selective reflective element itself to control the wavefront.

Figure 2:
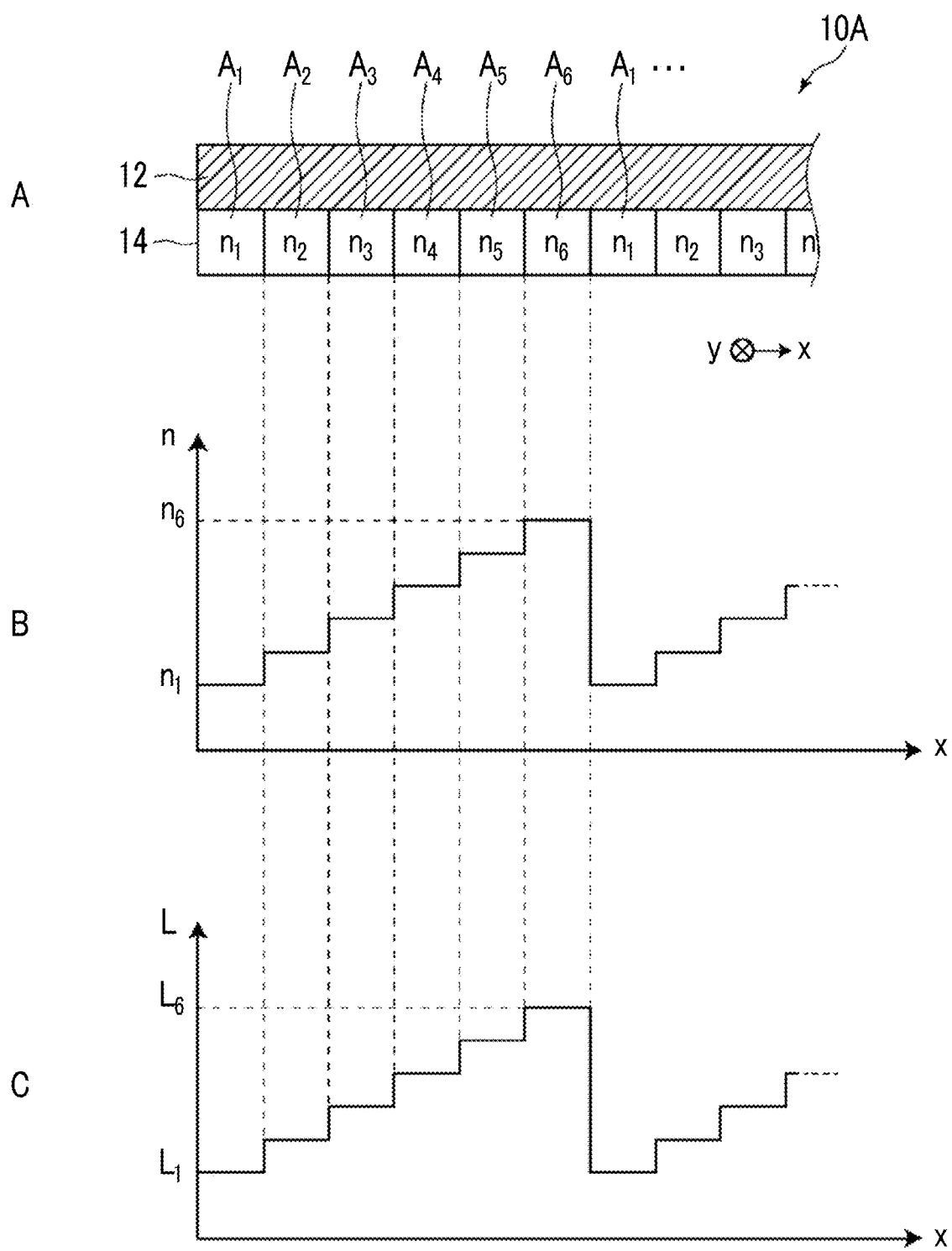

A of FIG. 2 shows a schematic cross-sectional view showing a first pattern configuration example of the absolute phase adjustment layer, B of FIG. 2 shows a refractive index distribution in an x-axis direction, and C of FIG. 2 shows an optical path length distribution in the x-axis direction.

Figure 3:
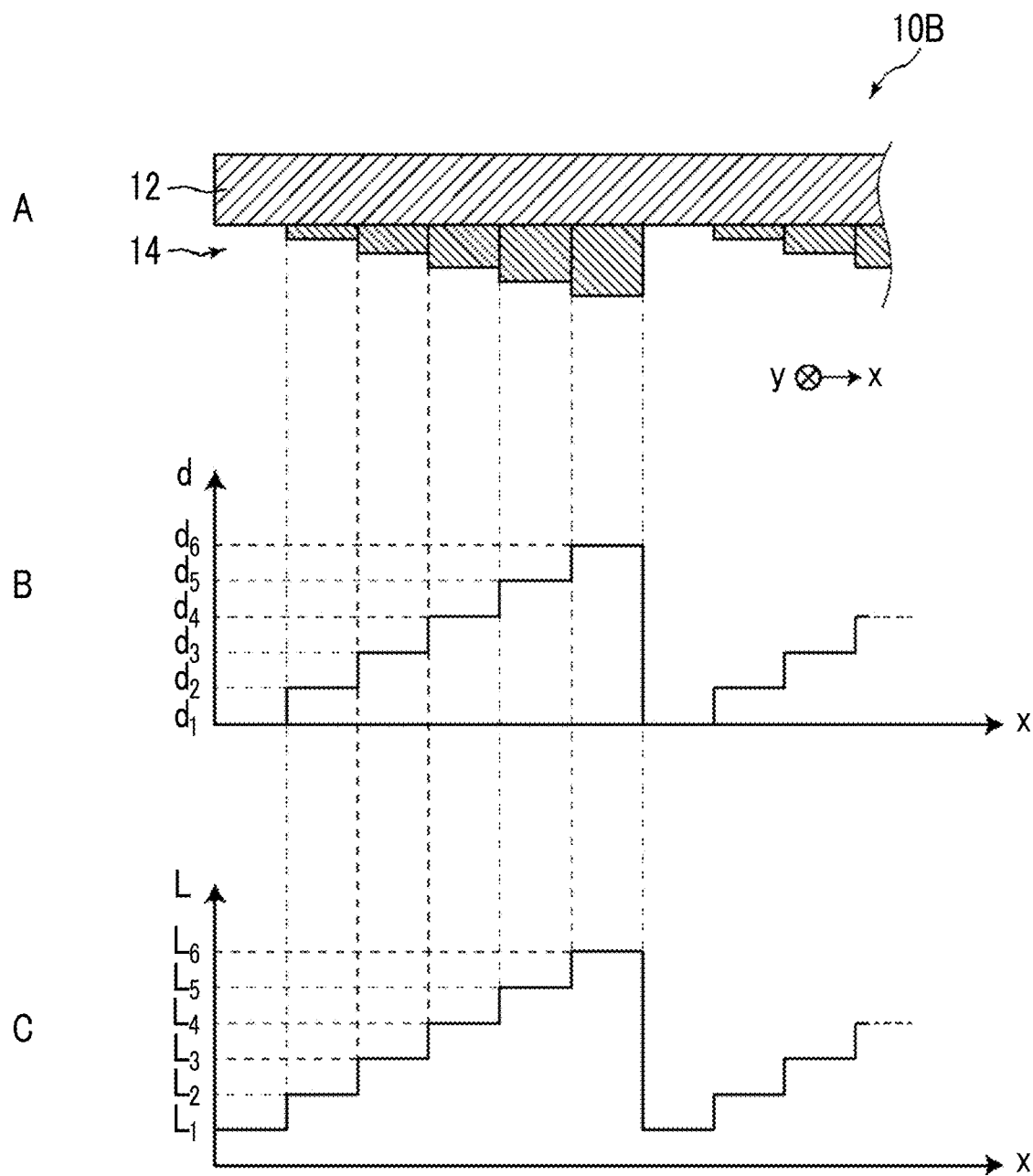

A of FIG. 3 is a schematic cross-sectional view showing a second pattern configuration example of the absolute phase adjustment layer, B of FIG. 3 shows a film thickness distribution in an x-axis direction, and C of FIG. 3 shows an optical path length distribution in the x-axis direction.

Figure 4:
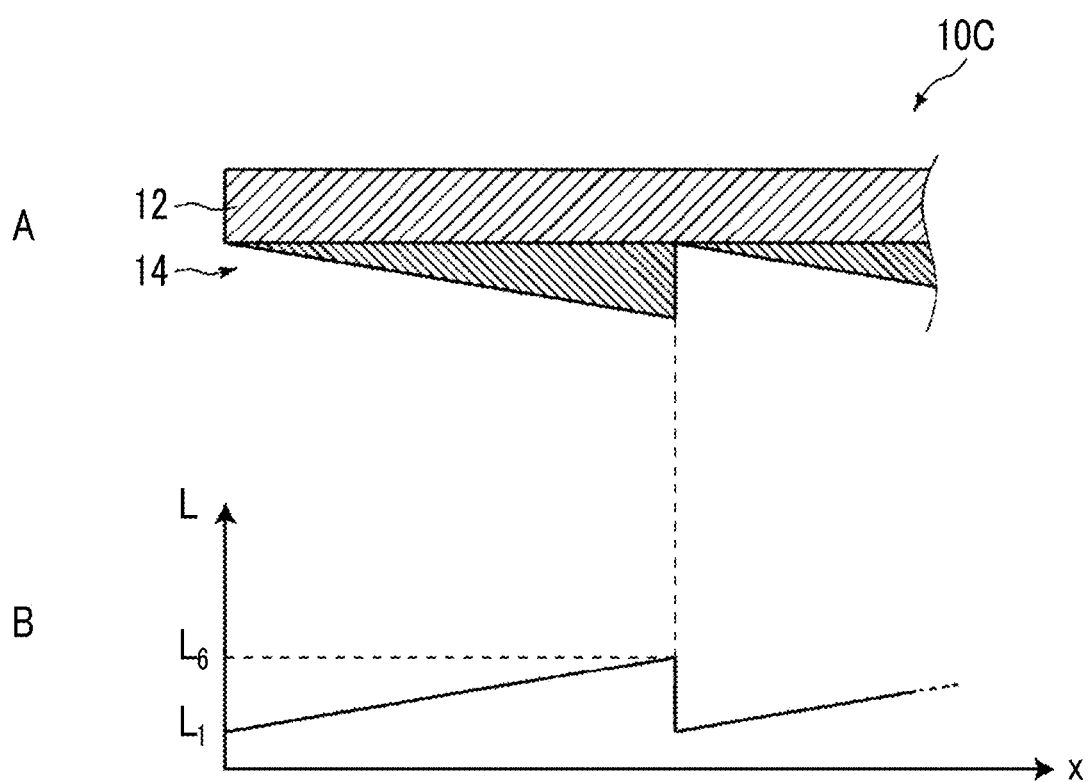

A of FIG. 4 is a schematic cross-sectional view showing a third pattern configuration example of the absolute phase adjustment layer, and B of FIG. 4 shows an optical path length distribution in an x-axis direction.

Figure 5:
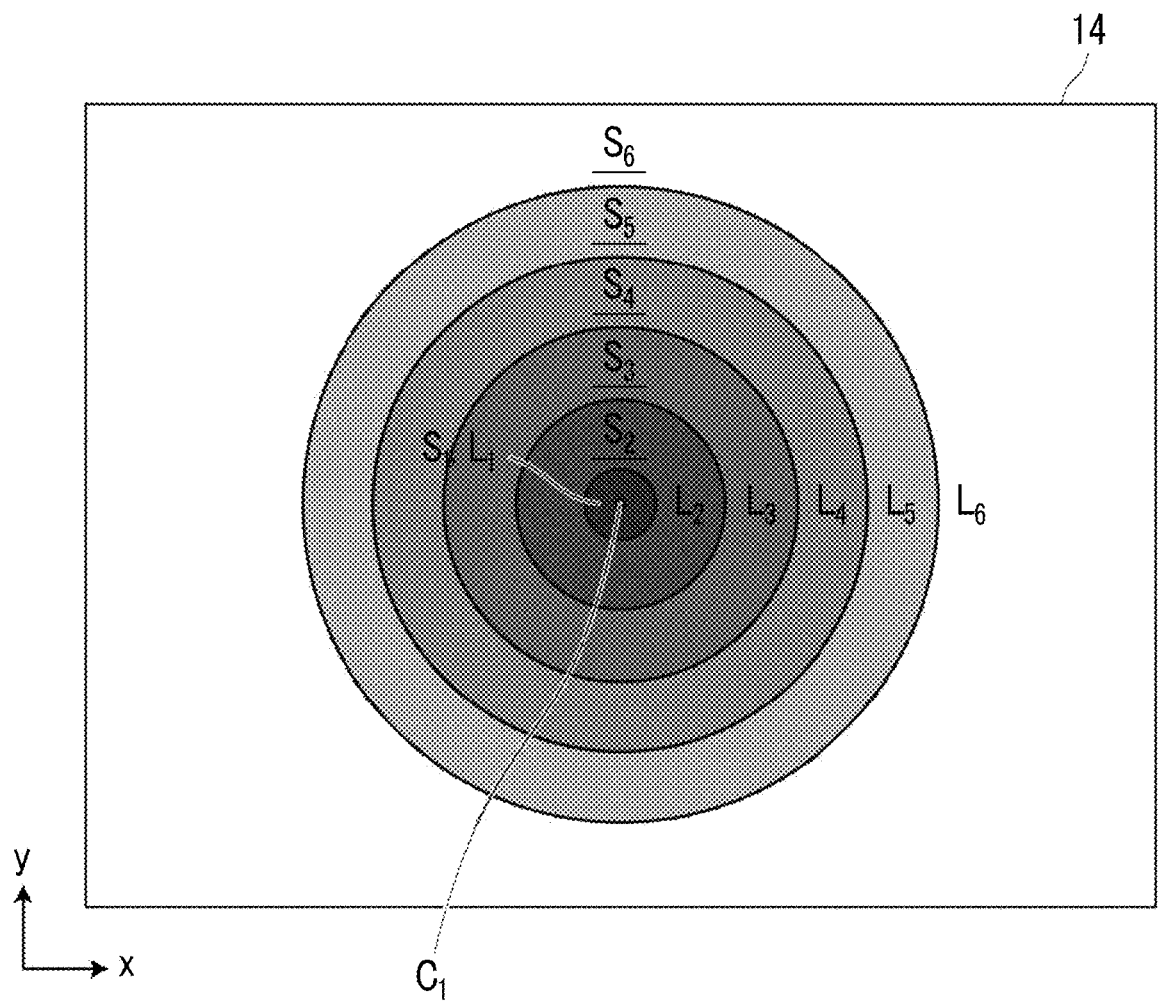

FIG. 5 is a plan view showing another example of the in-plane distribution of the optical path length in the absolute phase adjustment layer.

Figure 6:
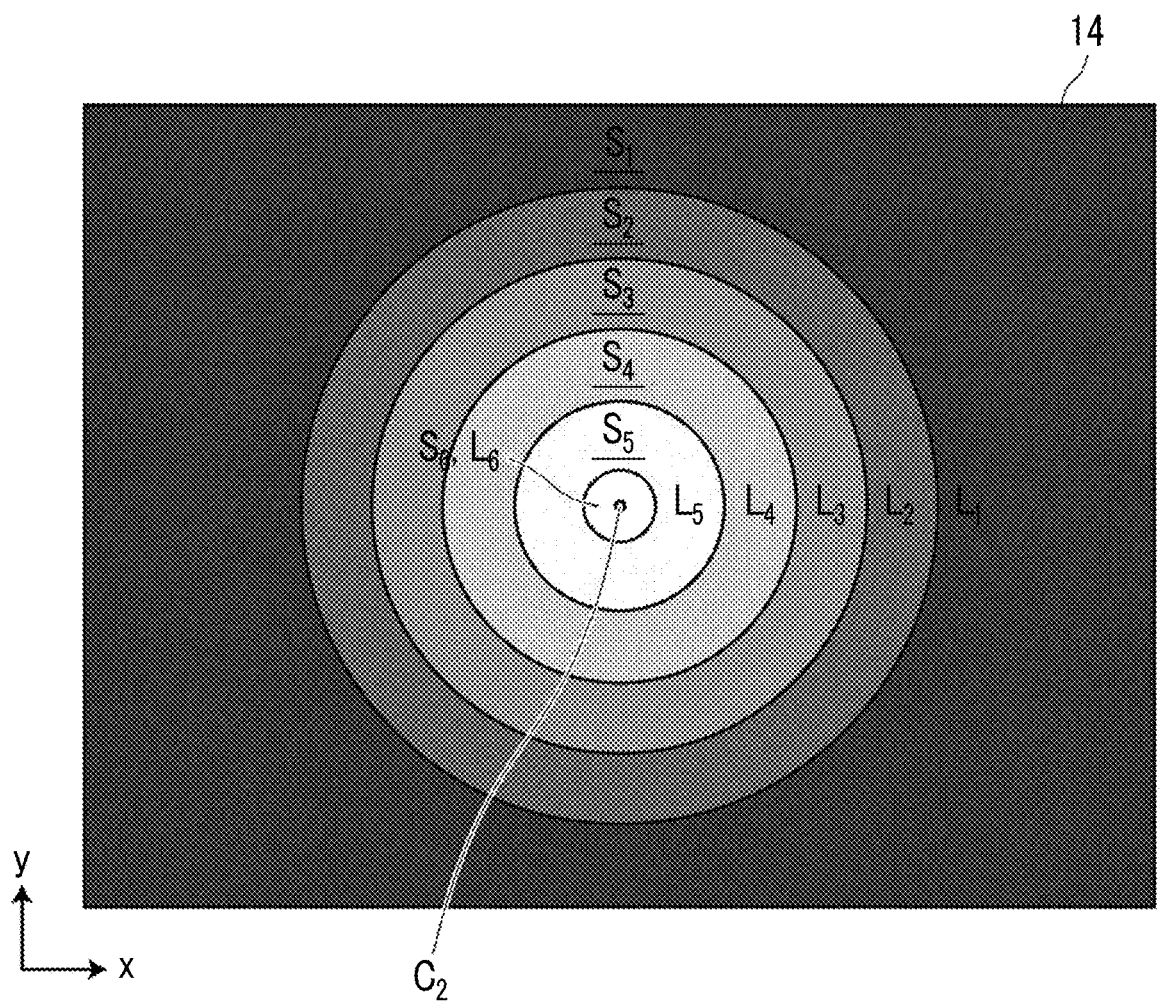

FIG. 6 is a plan view showing a further example of the in-plane distribution of the optical path length in the absolute phase adjustment layer.

Figure 7:
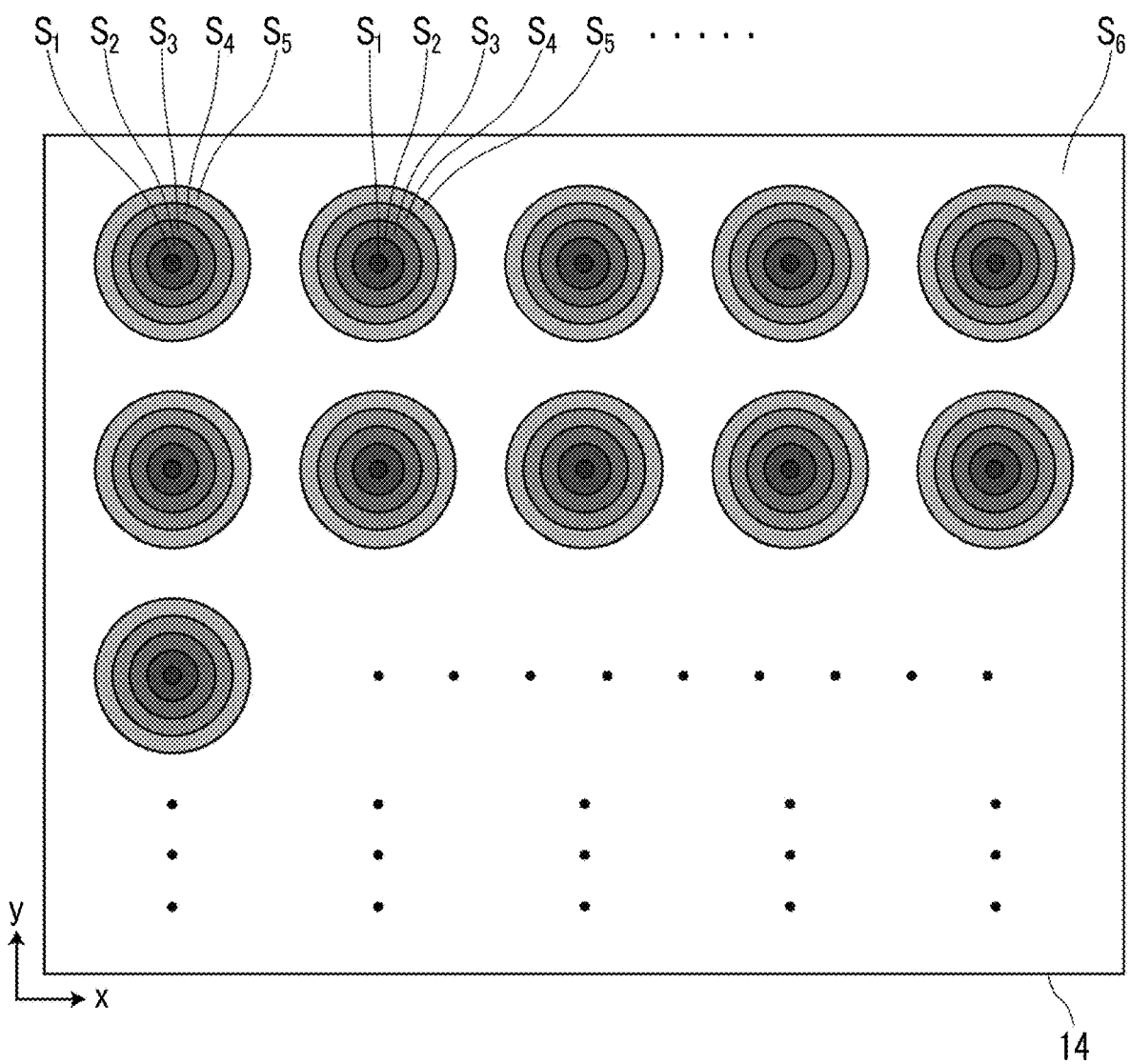

FIG. 7 is a plan view showing a still further example of the in-plane distribution of the optical path length in the absolute phase adjustment layer.

Figure 8:
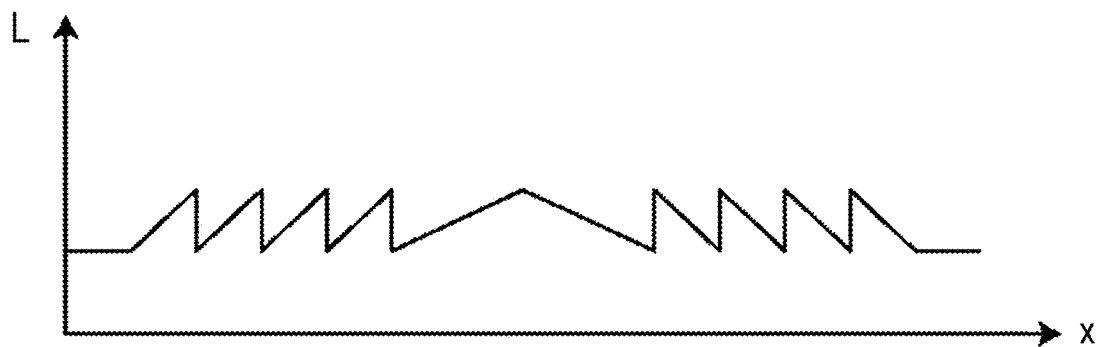

FIG. 8 is a diagram showing an optical path length distribution of the absolute phase adjustment layer in an x-axis direction.

Figure 9:
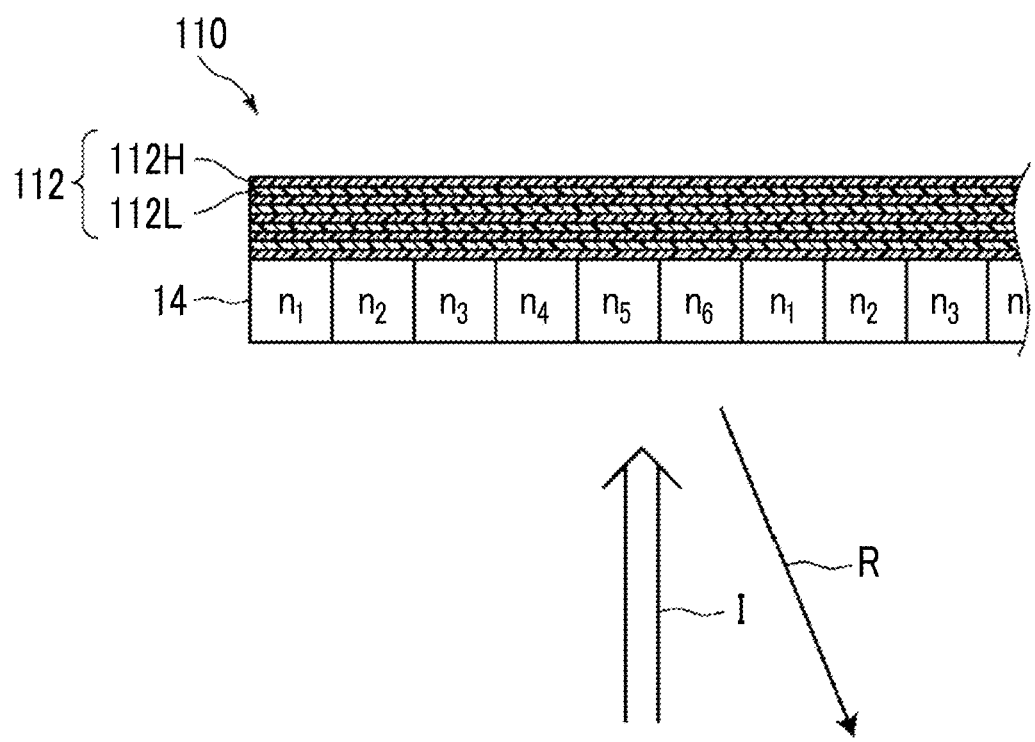

FIG. 9 is a schematic cross-sectional view showing a part of an optical laminate according to a second embodiment of the invention.

DESCRIPTION OF THE PREFERRED EMBODIMENTS

Hereinafter, embodiments of an optical laminate of the invention will be described with reference to the drawings. In the drawings, the scales of the constituent elements are appropriately changed from the actual ones in order to make them easier to see.

<Optical Laminate>

Figure 1:
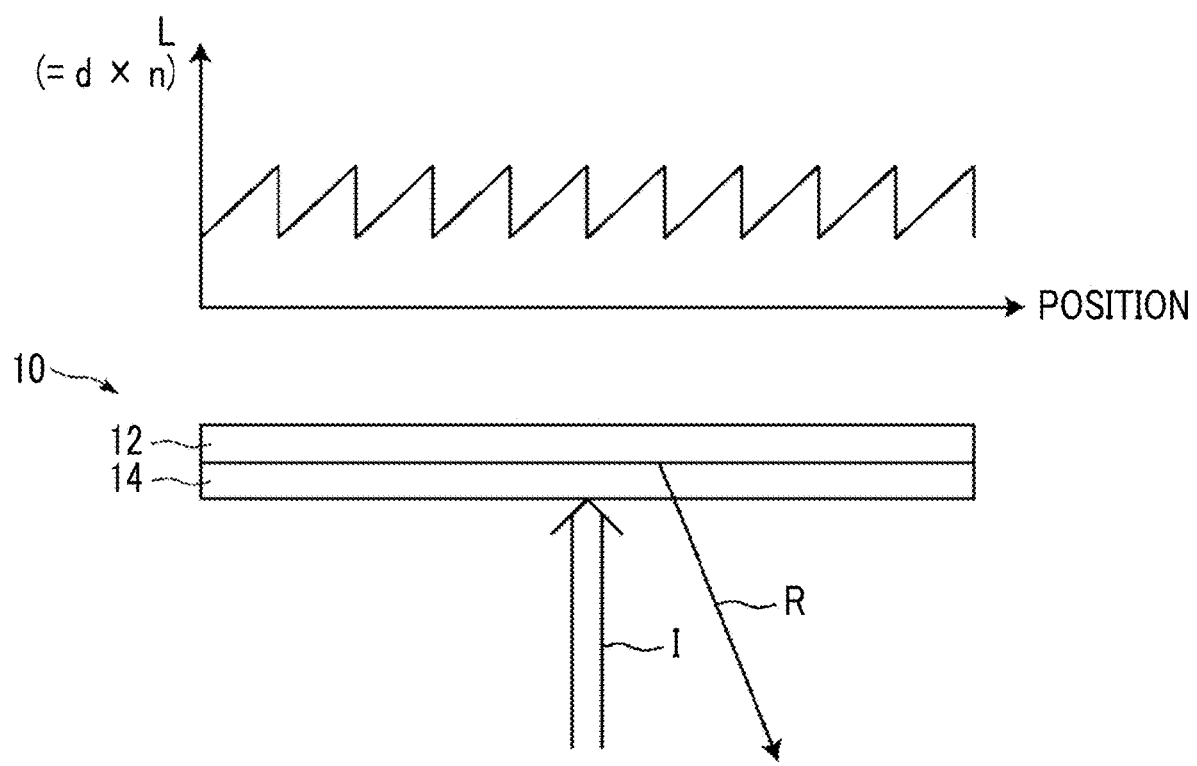
FIG. 1 shows a schematic side view showing an optical laminate according to a first embodiment of the invention and an optical path length distribution in an in-plane direction of an absolute phase adjustment layer.

FIG. 1 shows a side view of an optical laminate 10 according to a first embodiment of the invention, and a change in optical path length L (in-plane distribution of the optical path length) in one in-plane direction of an absolute phase adjustment layer 14.

The optical laminate 10 according to this embodiment has a wavelength selective reflective element 12 which is provided with a reflection layer reflecting light in a specific reflection wavelength region, and an absolute phase adjustment layer 14 which is provided on at least one surface side of the wavelength selective reflective element 12 and has optical isotropy.

In this embodiment, a cholesteric liquid crystal layer constituting the wavelength selective reflective element 12 is a liquid crystal phase in which molecules of a rod-like liquid crystal compound or a disk-like liquid crystal compound are helically arranged. The central wavelength of reflection can be adjusted by changing the pitch or the refractive index of the helical structure in the above cholesteric liquid crystal-line phase. The pitch of the helical structure can be easily adjusted by changing the amount of a chiral agent to be added.

The absolute phase adjustment layer has optical isotropy. Here, "has optical isotropy" means that a phase difference due to birefringence does not occur in the light passing through the absolute phase adjustment layer, that is, birefringence does not affect the polarization state of the passing light. However, a phase difference is allowed within such a range that the function of the absolute phase adjustment layer 14 to be described below is not impaired.

As shown in FIG. 1, in the absolute phase adjustment layer 14, the optical path length in a film thickness direction has an in-plane distribution. Here, the optical path length L has a pattern which changes like a sawtooth wave in one direction of the plane (for example, x-axis direction of x-y plane). The optical path length L is represented by the product of a refractive index n and a film thickness d.

By providing the absolute phase adjustment layer 14, the optical laminate 10 can emit, as light having a wavefront different from a wavefront at the time of incidence, reflected light R which is a left-handed or right-handed circularly polarized light component in a selective reflection wavelength region by the wavelength selective reflective element 12, of incidence light I incident on the optical laminate 10 from the side of the absolute phase adjustment layer 14.

In the configuration according to this embodiment, of the incidence light I perpendicularly entering the plane, the reflected light R reflected by the wavelength selective reflective element 12 is emitted in an oblique direction having an angle to the normal line of the plane.

The absolute phase adjustment layer 14 can generate an absolute phase corresponding to the optical path length in reflected light. Therefore, due to the in-plane distribution of the optical path length in the absolute phase adjustment layer 14, reflected light having an absolute phase changing depending on the incident position is generated, and reflection characteristics are strengthened or weakened. Accordingly, the light which enters the optical laminate 10 and is reflected has a wavefront different from a wavefront at the time of incidence as a whole.

That is, it is possible to control the wavefront of reflected light by the in-plane distribution of the optical path length of the absolute phase adjustment layer 14.

As described above, the optical path length L in a film thickness direction is represented by the product of the refractive index n and the film thickness d. Therefore, an in-plane distribution of at least one of the refractive index n or the film thickness d may be provided in order to generate an in-plane distribution of the optical path length L.

In the optical laminate according to the embodiment of the invention, since the wavefront of reflected light can be controlled by changing the absolute phase by the absolute phase adjustment layer 14, the reflection layer itself formed of a cholesteric liquid crystal layer does not require fine control of the alignment direction, and an in-plane uniform alignment treatment can be used.

Hereinafter, with reference to FIGS. 2 to 8, a pattern configuration example of the in-plane distribution of the optical path length in the absolute phase adjustment layer will be described.

FIG. 2 shows a first pattern configuration example in which an in-plane distribution of the optical path length is formed by providing an in-plane distribution of the refractive index n in the absolute phase adjustment layer 14. In FIG. 2, A is a schematic enlarged cross-sectional view of an optical laminate 10A, B shows a refractive index distribution of the absolute phase adjustment layer in an x-axis direction, and C shows an optical path length distribution of the absolute phase adjustment layer in the x-axis direction.

In the absolute phase adjustment layer 14, first to sixth regions $A_1$ to $A_6$ having different refractive indices $n_1$ to $n_6$, respectively, are periodically arranged in one in-plane direction. Film thicknesses d of the first to sixth regions $A_1$ to $A_6$ are the same. As shown in B of FIG. 2, the refractive indices $n_1$, $n_2$, $n_3$, $n_4$, $n_5$, and $n_6$ of the layers constituting the first to sixth regions $A_1$ to $A_6$ satisfy a relationship of $n_1<n_2<n_3<n_4<n_5<n_6$, and the refractive index is increased stepwise from the first region $A_1$ to the sixth region $A_6$. As shown C of FIG. 2, the optical path length L has a stepped distribution corresponding to the refractive index distribution, which is increased as the refractive index n is increased. With this configuration, the sawtooth wave-like optical path length pattern shown in the above embodiment can be substantially realized.

FIG. 3 shows a second pattern configuration example in which an in-plane distribution of the optical path length is formed by providing an in-plane distribution of the film thickness d in the absolute phase adjustment layer 14. In FIG. 3, A is a schematic enlarged cross-sectional view of an optical laminate 10B, B shows a film thickness distribution of the absolute phase adjustment layer in an x-axis direction, and C shows an optical path length distribution of the absolute phase adjustment layer in the x-axis direction.

The absolute phase adjustment layer 14 is configured such that a pattern in which the film thickness is changed stepwise from $d_1$ to $d_6$ is periodically provided. In this example, the absolute phase adjustment layer 14 is formed of the same composition in the entire region, and the refractive index is uniform over the entire region. As shown in B of FIG. 3, the film thickness is increased stepwise from $d_1$ to $d_6$, and as shown in C of FIG. 3, the optical path length L has a stepped distribution corresponding to the film thickness distribution, which is increased as the film thickness is increased. With this configuration, the sawtooth wave-like optical path length pattern shown in the above embodiment can be substantially realized.

FIG. 4 shows a third pattern configuration example in which an in-plane distribution of the optical path length is formed by providing an in-plane distribution of the film thickness d in the absolute phase adjustment layer 14 as in the second pattern configuration example. In FIG. 4, A is a schematic enlarged cross-sectional view of an optical laminate 10C, and B shows an optical path length distribution of the absolute phase adjustment layer in an x-axis direction.

The absolute phase adjustment layer 14 is configured such that regions where the film thickness is changed gradually (smoothly) are periodically provided. As shown in FIG. 4, the absolute phase adjustment layer 14 has a sawtooth wave-like cross-sectional shape. As in the example of FIG. 3, the absolute phase adjustment layer 14 is formed of the same composition in the entire region, and the refractive index is uniform over the entire region. With this configuration, the optical path length L is gradually increased from $L_0$ to $L_t$ as the film thickness is increased as shown in B of FIG. 4. That is, the optical path length L has a sawtooth wave-like pattern corresponding to the film thickness pattern.

In the examples shown in FIGS. 2 to 4, the case where the optical path length is changed like a sawtooth wave by changing only the refractive index or only the film thickness has been described, but the optical path length may be similarly changed by changing both the refractive index and the film thickness.

In FIGS. 2 to 4, the example in which the optical path length is changed like a sawtooth wave in the x-axis direction has been shown, but the in-plane distribution of the optical path length is not limited thereto, and various designs can be made according to the purpose. FIGS. 5 to 8 are schematic plan views showing other examples of the in-plane distribution of the optical path length in the absolute phase adjustment layer 14 of the optical laminate.

The absolute phase adjustment layer 14 shown in FIG. 5 has first to sixth regions $S_1$ to $S_6$ having different optical path lengths $L_1$ to $L_6$, respectively, and arranged concentrically with a predetermined point $C_1$ as a center from the point $C_1$ to the outside. Here, the optical path lengths $L_1$ to $L_6$ satisfy $L_1<L_2<L_3<L_4<L_5<L_6$. In this configuration, the optical path length has an in-plane distribution in which the optical path length is increased with an increase in distance from the point $C_1$. Such an in-plane distribution of the optical path length can be realized by changing the refractive index or the film thickness for each region.

The in-plane distribution pattern of the optical path length shown in FIG. 5 exhibits a convex lens function, and can diverge reflected light.

The absolute phase adjustment layer 14 shown in FIG. 6 has first to sixth regions $S_1$ to $S_6$ having different optical path lengths $L_1$ to $L_6$, respectively, and arranged concentrically with a predetermined point $C_2$ as a center from the outside to the point $C_2$. Here, the optical path lengths $L_1$ to $L_6$ satisfy $L_1<L_2<L_3<L_4<L_5<L_6$. In this configuration, the optical path length has an in-plane distribution in which the optical path length is reduced with an increase in distance from the point $C_2$. Such an in-plane distribution of the optical path length can be realized by changing the refractive index or the film thickness for each region.

The in-plane distribution pattern of the optical path length shown in FIG. 6 exhibits a concave lens function, and can condense reflected light.

As shown in FIG. 7, the absolute phase adjustment layer 14 may have a plurality of the in-plane distribution patterns of the optical path length exhibiting a convex lens function shown in FIG. 5, which are arranged in horizontal and vertical directions to have a microlens array function.

The in-plane distribution of the optical path length in the absolute phase adjustment layer 14 may be a combination of two or more of the above-described plurality of patterns.

FIG. 8 is a diagram showing a change in the x-axis direction of the optical path length in the absolute phase adjustment layer 14. The absolute phase adjustment layer 14 may have an in-plane distribution pattern of the optical path length like a Fresnel lens as shown in FIG. 8.

The optical laminate according to the embodiment of the invention may have a configuration in which a wavelength selective reflective element and an absolute phase adjustment layer are laminated in order on an alignment layer provided on one surface of a support. Another layer having optical isotropy may be provided between the wavelength selective reflective element and the absolute phase adjustment layer. The wavelength selective reflective element and the absolute phase adjustment layer may be adhered via an adhesion layer.

In the above-described embodiment, the case where in the optical laminate, the wavelength selective reflective element is provided with a reflection layer selectively reflecting light in a specific reflection wavelength region, and the reflection layer is formed of a cholesteric liquid crystal layer has been described, but the wavelength selective reflective element is not limited thereto. In the wavelength selective reflective element, the reflection layer may be a dielectric multilayer film.

FIG. 9 is a schematic cross-sectional view showing a part of an optical laminate 110 according to a second embodiment of the invention.

The optical laminate 110 according to this embodiment is provided with, in place of the wavelength selective reflective element 12 formed of a reflection layer which is a cholesteric liquid crystal layer in the optical laminate 10 according to the first embodiment, a wavelength selective reflective element 112 formed of a reflection layer which is a dielectric multilayer film in which at least two layers having different refractive indices are alternately laminated in multiple layers.

The dielectric multilayer film is formed by alternately laminating a high refractive index layer 112H having a relatively high refractive index and a low refractive index layer 112L having a relatively low refractive index. Each of the high refractive index layer 112H and the low refractive index layer 112L may be formed of an organic layer or an inorganic layer. In addition, the dielectric multilayer film may selectively reflect a specific wavelength region, and may or may not have polarization reflection properties.

Since the optical laminate 110 is provided with the same in-plane distribution of the optical path length as the absolute phase adjustment layer 14 of the first configuration example of the optical laminate 10 according to the first embodiment, an effect similar to that of the first embodiment is obtained. That is, of incidence light I perpendicularly entering the plane, reflected light R reflected by the wavelength selective reflective element 112 is emitted in an oblique direction having an angle to the normal line of the plane.

By appropriately setting the layer configuration of the dielectric multilayer film, such as the refractive indices of the high refractive index layer 112H and the low refractive index layer 112L, a difference in refractive index between the high refractive index layer and the low refractive index layer, and the layer thicknesses, it is possible to set a central wavelength of reflection and a reflection wavelength range which are desired, that is, a specific reflection wavelength region.

In a case where the high refractive index layer 112H and the low refractive index layer 112L constituting the dielectric multilayer film do not have in-plane anisotropy, no polarization reflection properties are imparted, and thus light in a specific reflection wavelength region is reflected regardless of the polarization.

At least one of the high refractive index layer 112H or the low refractive index layer 112L constituting the dielectric multilayer film may have in-plane anisotropy to reflect specific linearly polarized light.

In the optical laminate, although the polarization of reflected light varies depending on the polarization characteristics of the reflection layer, other actions are almost the same. In a case where the reflection layer is a cholesteric liquid crystal layer, specific circularly polarized light corresponding to the direction of the helix of the cholesteric phase is reflected. In a case where the reflection layer is a dielectric multilayer film having no polarization characteristics, reflection is performed regardless of polarization. In a case where the reflection layer is a dielectric multilayer film having linear polarization reflection properties, specific linearly polarized light is reflected. As above, in the optical laminate according to the embodiment of the invention, the wavefront of polarized or non-polarized incident light corresponding to the polarization characteristics of each reflection layer in a specific reflection wavelength region of each reflection layer is controlled according to the pattern of the absolute phase adjustment layer, and thus reflected light is emitted in a direction different from the specular reflection direction of the incident light.

Hereinafter, materials of the layers constituting the optical laminate will be described.

[Wavelength Selective Reflective Element]

[[Reflection Layer: Cholesteric Liquid Crystal Layer]]

By changing the pitch or the refractive index of the helical structure in the cholesteric liquid crystalline phase, the central wavelength of reflection can be adjusted. The pitch of the helical structure can be easily adjusted by changing the amount of a chiral agent to be added. Detailed description thereof is given as in Fuji Film research & development No. 50 (2005), p. 60 to 63. The pitch can also be adjusted by conditions such as a temperature, an illuminance, and an irradiation time in fixation of the cholesteric liquid crystalline phase.

The cholesteric liquid crystal layer selectively reflects either one of right-handed circularly polarized light or left-handed circularly polarized light in the reflection wavelength region, and transmits the other circularly polarized light.

(Polymerizable Liquid Crystal Compound)

A polymerizable liquid crystal composition for forming a cholesteric liquid crystal layer contains a rod-like liquid crystal compound or a disk-like liquid crystal compound, and may further contain other components such as a chiral agent, an alignment control agent, a polymerization initiator, and an alignment aid.

Rod-Like Liquid Crystal Compound

As the rod-like liquid crystal compound, azomethines, azoxys, cyanobiphenyls, cyanophenyl esters, benzoates, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexylbenzonitriles are preferably used. In addition to the above low-molecular liquid crystal compounds, high-molecular liquid crystal compounds can also be used.

The alignment of the rod-like liquid crystal compound is more preferably fixed by polymerization, and as a polymerizable rod-like liquid crystal compound, compounds described in Makromol. Chem., Vol. 190, p. 2255 (1989), Advanced Materials Vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H01-272551A), JP1994-016616A (JP-H06-016616A), JP1995-110469A (JP-H07-110469A), JP1999-080081A (JP-H11-080081A), JP2001-064627A, and the like can be used. Furthermore, as the rod-like liquid crystal compound, for example, those described in JP1999-513019A (JP-H11-513019A) and JP2007-279688A can also be preferably used.

Disk-Like Liquid Crystal Compound

As the disk-like liquid crystal compound, for example, those described in JP2007-108732A and JP2010-244038A can be preferably used.

Hereinafter, preferable examples of the disk-like liquid crystal compound will be shown, but the invention is not limited thereto.

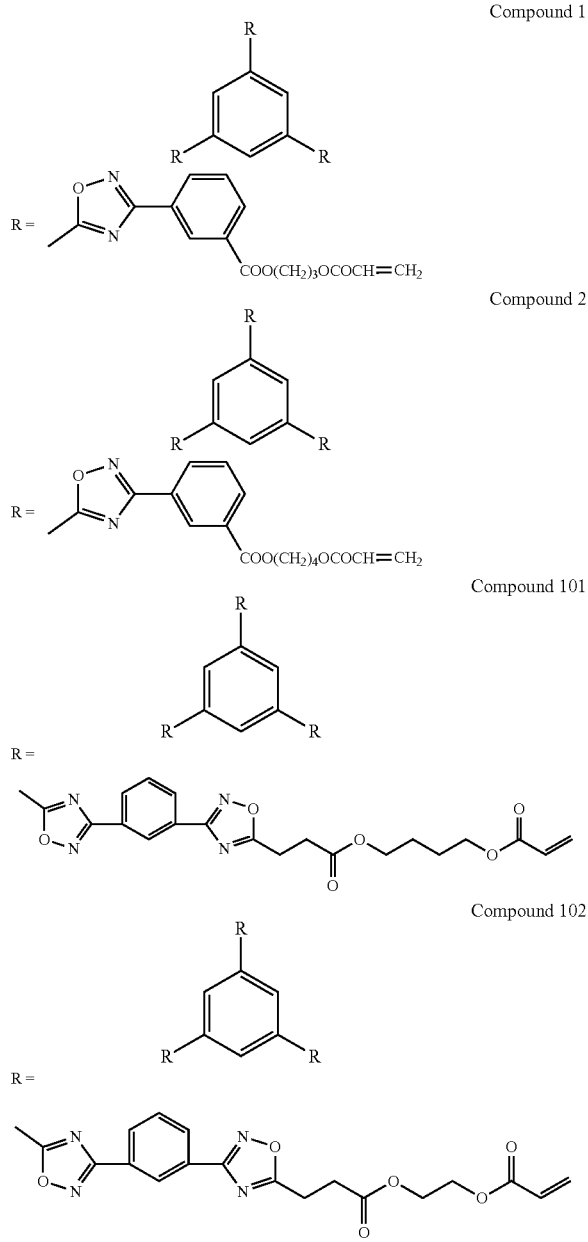

Compound 1
Compound 2
Compound 101
Compound 102

Other Components

The composition which is used for forming a cholesteric liquid crystal layer may contain other components such as a chiral agent, an alignment control agent, a polymerization initiator, and an alignment aid, in addition to the disk-like liquid crystal compound. A known material can be used as any of them.

—Solvent—

As a solvent of the composition for forming a cholesteric liquid crystal layer, an organic solvent is preferably used. Examples of the organic solvent include amides (e.g., N,N-dimethylformamide), sulfoxides (e.g., dimethylsulfoxide), heterocyclic compounds (e.g., pyridine), hydrocarbons (e.g., benzene and hexane), alkyl halides (e.g., chloroform and dichloromethane), esters (e.g., methyl acetate and butyl acetate), ketones (e.g., acetone, methyl ethyl ketone, and cyclohexanone), and ethers (e.g., tetrahydrofuran and 1,2-dimethoxyethane). Alkyl halides and ketones are preferable. Two or more types of organic solvents may be used in combination.

(Application and Curing of Polymerizable Liquid Crystal Composition)

In order to apply the polymerizable liquid crystal composition, the polymerizable liquid crystal composition is allowed to be in a solution state with a solvent, or is turned into a liquid material such as a melt by heating, and the resulting material is applied by a proper method such as a roll coating method, a gravure printing method, or a spin coating method. The polymerizable liquid crystal composition can also be applied by various methods such as a wire bar coating method, an extrusion coating method, a direct gravure coating method, a reverse gravure coating method, and a die-coating method. A coating film can also be formed by discharging a liquid crystal composition from a nozzle using an ink jet apparatus.

Thereafter, the polymerizable liquid crystal composition is cured to maintain and fix the alignment state of molecules of the liquid crystal compound. The curing is preferably performed by a polymerization reaction of a polymerizable group introduced into the liquid crystal molecule.

After the application of the polymerizable liquid crystal composition and before the polymerization reaction for curing, the coating film may be dried by a known method. For example, it may be dried by leaving or heating.

The liquid crystal compound molecules in the polymerizable liquid crystal composition may be aligned in the steps of applying and drying the polymerizable liquid crystal composition.

[Reflection Layer: Dielectric Multilayer Film]

The dielectric multilayer film is formed by laminating two or more dielectric layers having different refractive indices, and by adjusting the refractive index or the thickness of each layer, a reflection layer capable of selectively reflecting a desired wavelength region is formed.

A dielectric multilayer film formed of an organic layer can be formed by, for example, alternately laminating two types of aligned birefringent polymer layers. For example, the dielectric multilayer film can be formed with reference to materials of a multilayer optical film and multilayer optical film forming methods described in JP1999-508378A (JP-H11-508378A).

In addition, a dielectric multilayer film formed of an inorganic layer can be formed with reference to, for example, materials of a dielectric multilayer film and dielectric multilayer film forming methods described in WO2014/010532A. As the inorganic material, a metal oxide is mainly used. The metal oxide which can be used is not particularly limited, but is preferably a transparent dielectric material. Examples thereof include titanium oxide, zirconium oxide, zinc oxide, synthetic amorphous silica, colloidal silica, alumina, colloidal alumina, lead titanate, red lead, chrome yellow, zinc yellow, chromium oxide, ferric oxide, iron black, copper oxide, magnesium oxide, magnesium hydroxide, strontium titanate, yttrium oxide, niobium oxide, europium oxide, lanthanum oxide, zircon, and tin oxide, and any of a low refractive index layer and a high refractive index layer may be appropriately used in combination to adjust the refractive index. Among the above examples, titanium oxide, zirconium oxide, zinc oxide, and the like are preferably used as the high refractive index material according to the invention, and from the viewpoint of stability of the metal oxide particle-containing composition for forming the high refractive index layer, titanium oxide is more preferably used. Among titanium oxides, rutile type titanium oxides having low photocatalytic activity and a high refractive index are particularly preferably used.

[Absolute Phase Adjustment Layer]

The composition constituting the absolute phase adjustment layer is not particularly limited as long as it has optical isotropy and can form an in-plane distribution of the optical path length. Examples thereof include indium tin oxide (ITO) and a material obtained by adding metal oxide fine particles to a resin material. A known material can be appropriately used as a transparent material for refractive index adjustment.

As a material realizing a low refractive index, for example, a composition containing a fluorine-containing curable resin and inorganic fine particles described in JP2007-298974A, or a low refractive index coating containing hollow silica particles described in JP2002-317152A, JP2003-202406A, and JP2003-292831A can be preferably used.

As a material realizing a high refractive index, for example, those described in paragraphs [0054] to [0057] of JP2002-311204A and generally known high refractive index materials can also be used. Specifically, those described in paragraphs [0074] to [0094] of JP2008-262187A can be used. Furthermore, a refractive index photomodulation type material which changes the refractive index value by light irradiation can also be used. For example, a material such as a photopolymer which is used for holography can be used.

(Formation of Absolute Phase Adjustment Layer)

Regions having different refractive indices can be formed in a pattern by preparing a plurality of compositions containing the material realizing a low refractive index or the material realizing a high refractive index described above, and by repeating, for each composition, a procedure including applying the composition to a desired position on a wavelength selective reflective element or on a temporary support using a mask, and curing the composition by exposure.

The patterns shown in FIGS. 3 to 6 can be formed with reference to, for example, methods described in JP2004-114419A. Specifically, a pattern can be formed through a process including applying a curable composition to a support, pressure-bonding the composition using an embossing mold or the like having a desired shape, and curing the composition.

Next, other layers which can be provided in the optical laminate will be described.

[Support]

As the support, a transparent support is preferable, and examples thereof include polyacrylic resin films such as polymethyl methacrylate, cellulose resin films such as cellulose triacetate, and cycloolefin polymer films [for example, trade name "ARTON" manufactured by JSR Corporation, and trade name "ZEONOR" manufactured by ZEON Corporation]. The support is not limited to a flexible film, and may be a non-flexible substrate such as a glass substrate.

The optical laminate according to the embodiment of the invention may be used while being supported by a support during film formation. Otherwise, the support during film formation may be a temporary support, and the optical laminate may be transferred to another support and used after peeling of the temporary support.

[Alignment Layer]

In a case where the wavelength selective reflective element is provided with a cholesteric liquid crystal layer, an alignment layer may be provided on a film forming surface of the element. The alignment layer can be provided by means such as rubbing of an organic compound (preferably a polymer), oblique vapor deposition of an inorganic compound, or formation of a layer having microgrooves. Alignment layers have also been known in which alignment functions are generated by application of an electric field, application of a magnetic field, or light irradiation. The alignment layer is preferably formed by rubbing a surface of a polymer film. The alignment layer is preferably peeled off together with the support.

Depending on the type of the polymer used for the support, it is possible to make the support to function as an alignment layer through a direct alignment treatment (for example, rubbing) without providing an alignment layer. Examples of such a support include polyethylene terephthalate (PET).

[Adhesion Layer (Pressure Sensitive Adhesive Layer)]

In this specification, "adhesion" is a concept including "pressure-sensitive adhesion".

In a case where the wavelength selective reflective element and the absolute phase adjustment layer are laminated, these may be laminated via an adhesion layer.

Examples of the pressure sensitive adhesive which is used for the adhesion layer include resins such as polyester resins, epoxy resins, polyurethane resins, silicone resins, and acrylic resins. These may be used alone or in combination of two or more types thereof. Acrylic resins are particularly preferable since these are excellent in reliability such as water resistance, heat resistance, and light resistance and have good adhesion properties and transparency, and the refractive index is easily adjusted so as to be suitable for a liquid crystal display.

A sheet-like photocurable pressure sensitive adhesive (described in TOAGOSEI GROUP RESEARCH ANNUAL REPORT 11, TREND 2011, No. 14) can also be used as the adhesion layer. It facilitates bonding between optical films like a pressure sensitive adhesive, is crosslinked and cured by ultraviolet rays (UV), and has improved storage modulus of elasticity, adhesion properties, and heat resistance. Adhesion using the sheet-like photocurable pressure sensitive adhesive is a method suitable for the invention.

EXAMPLES

Hereinafter, examples and comparative examples of the optical laminate according to the embodiment of the invention will be described.

Example 1

An optical laminate comprising a reflection layer formed of a cholesteric liquid crystal layer as a wavelength selective reflective element was formed. A cholesteric liquid crystal layer was formed on an alignment layer provided on a glass substrate, and an absolute phase adjustment layer separately formed was bonded to the cholesteric liquid crystal layer to form an optical laminate. Details thereof will be described below.

(Formation of Alignment Layer)

Components of an alignment layer forming composition A shown below were stirred and dissolved in a container kept at 80° C. to prepare the alignment layer forming composition A.

| Alignment Layer Forming Composition A (parts by mass) | |
|---|---|
| Pure Water | 97.2 |
| PVA-205 (manufactured by KURARAY CO., LTD.) | 2.8 |

The alignment layer forming composition A prepared as described above was uniformly applied to a glass substrate using a slit coater, and then dried in an oven at 100° C. for 2 minutes to obtain a glass substrate with an alignment layer having a film thickness of 0.5 µm.

(Formation of Cholesteric Liquid Crystal Layer)

Components of a cholesteric liquid crystal composition Gm shown below were stirred and dissolved in a container kept at 25° C. to prepare the cholesteric liquid crystal composition Gm.

| Cholesteric Liquid Crystal Composition Gm (parts by mass) | |
|---|---|
| Methoxyethyl Acrylate | 145.0 |
| Following Mixture of Rod-Like Liquid Crystal Compounds | 100.0 |
| IRGACURE 819 (manufactured by BASF SE) | 10.0 |
| Chiral Agent A Having Following Structure | 5.98 |
| Surfactant Having Following Structure | 0.08 |

Rod-Like Liquid Crystal Compound

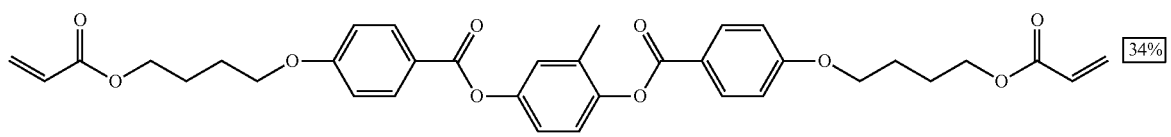

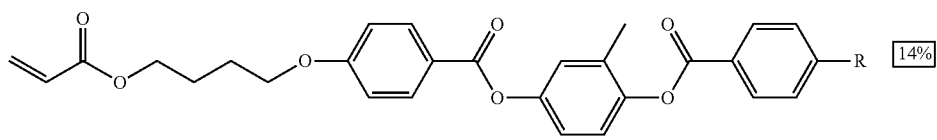

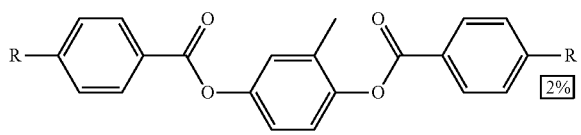

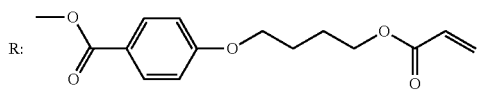

Numerical values represent mass %, and R is a group which is bonded with an oxygen atom.

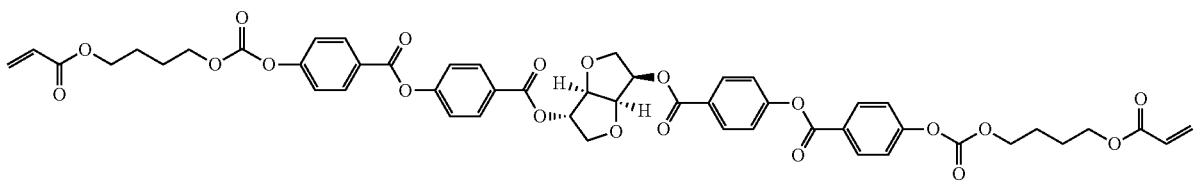

Chiral Agent A

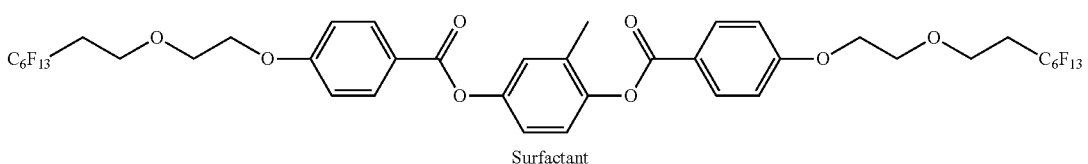

Surfactant

The cholesteric liquid crystal composition Gm is a material which forms a layer reflecting light having a central wavelength of 532 nm. In addition, the cholesteric liquid crystal composition Gm is a material which forms a layer reflecting right-handed circularly polarized light. That is, the cholesteric liquid crystal composition Gm is a material for forming a right polarizing green layer.

After rubbing of the alignment film surface of the glass substrate with an alignment film formed as above, the cholesteric liquid crystal composition Gm prepared as above was uniformly applied using a slit coater, and then dried at 95° C. for 30 seconds. Then, the composition was irradiated with ultraviolet rays of 500 mJ/cm$^2$ at room temperature by an ultraviolet ray irradiation device so as to be cured to form a reflection layer formed of a cholesteric liquid crystal layer having a film thickness of 2 μm. The reflectivity of the cholesteric layer was measured, and the central wavelength of reflection was about 532 nm. A cross-section of the cholesteric liquid crystal layer was observed, and a twisted structure of about 8 pitches (8 rotations) was formed.

(Formation of Absolute Phase Adjustment Layer)

On the cholesteric liquid crystal layer provided on the alignment layer on the glass substrate, an absolute phase adjustment layer having an in-plane distribution, in which a pattern of first to sixth regions having different refractive indices and arranged in one direction as shown in FIG. 2 is periodically repeated was formed.

—Preparation of Composition for Forming First to Sixth Regions—

[Preparation of Dispersion D1]

Components of a dispersion D1 having the following composition were blended, mixed with 17,000 parts by mass of zirconia beads (0.3 mmφ), and dispersed for 12 hours using a paint shaker. The zirconia beads (0.3 mm) were separated by filtration to obtain the dispersion D1.

| Dispersion D1 (parts by mass) | |
|---|---|
| Zirconium Dioxide (zirconia) (manufactured by Nissan Chemical Corporation, trade name: NANOUSE ZR, average primary particle diameter: 10 to 30 nm) | 1875 |
| DISPERBYK-111 (manufactured by BYK Additives & Instruments) 30% PGMEA Solution | 2200 |
| Solvent PGMEA | 3425 |

[[Synthesis of Polymer E1]]

89 g of diethylene glycol methyl ethyl ether (MEDG: manufactured by TOHO Chemical Industry Co., Ltd.) was put into a three-necked flask, and the temperature was raised to 90° C. under a nitrogen atmosphere. To the above solution, 0.4 molar equivalent of 1-ethoxyethyl methacrylate (MAEVE: manufactured by FUJIFILM Wako Pure Chemical Corporation), 0.3 molar equivalent of glycidyl methacrylate (GMA: manufactured by FUJIFILM Wako Pure Chemical Corporation), 0.1 molar equivalent of methacrylic acid (MAA: manufactured by FUJIFILM Wako Pure Chemical Corporation), 0.2 molar equivalent of hydroxyethyl methacrylate (HEMA: manufactured by FUJIFILM Wako Pure Chemical Corporation), and V-65 (azo polymerization initiator; manufactured by FUJIFILM Wako Pure Chemical Corporation, equivalent to 4 mol % with respect to a total of 100 mol % of all monomer components) were dissolved, and the resulting mixture was added dropwise for 2 hours. After the dropwise addition was stopped, stirring was performed for 2 hours, and the reaction was stopped. Accordingly, a polymer E1 was obtained. The ratio of the content of MEDG to the content of other components was set to 60:40. That is, a polymer solution in which the concentration of solid contents was 40% was prepared.

[Preparation of Refractive Index Layer Forming Compositions C1 to C6]

Materials were mixed with the composition (parts by mass) shown in the following Table 1, and thus a homogeneous solution was prepared. Then, the solution was filtered using a polyethylene filter having a pore size of 0.2 μm to prepare refractive index layer forming compositions C1 to C6.

TABLE 1

| | C1 | C2 | C3 | C4 | C5 | C6 |
|---|---|---|---|---|---|---|
| PGMEA | 100 | 100 | 100 | 100 | 100 | 100 |
| Dispersion D1 | 0 | 188.2 | 282.2 | 376.3 | 470.4 | 564.5 |
| Polymer E1 | 713.3 | 533.3 | 443.3 | 353.3 | 263.3 | 173.3 |
| Photo Acid Generator | 5.1 | 5.1 | 5.1 | 5.1 | 5.1 | 5.1 |
| Photosensitizer | 5.1 | 5.1 | 5.1 | 5.1 | 5.1 | 5.1 |
| Base | 0.2 | 0.2 | 0.2 | 0.2 | 0.2 | 0.2 |
| Surfactant | 0.2 | 0.2 | 0.2 | 0.2 | 0.2 | 0.2 |

[[Photo Acid Generator]]

PAG-1: A compound having the following structure synthesized according to a method described in paragraph [0108] of JP2002-528451A (Ts represents trisulfonate).

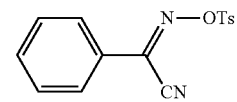 [SMILES: Cc1ccc(S(=O)(=O)O/N=C(\C#N)c2ccccc2)cc1]

[[Photosensitizer]]

Sensitizer 1: Dibutoxyanthracene having the following structure (producer: manufactured by Kawasaki Kasei Chemicals., product number: 9,10-dibutoxyanthracene)

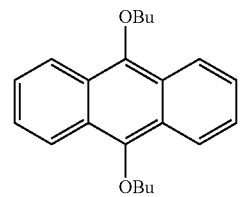

[[Basic Compound]]

Basic Compound: A compound having the following structure (producer: manufactured by TOYOKASEI CO., LTD., product number: CMTU)

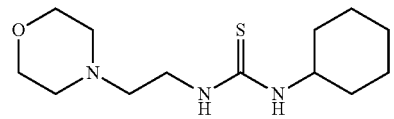 [SMILES: S=C(NCCN1CCOCC1)NC1CCCCC1]

[[Surfactant]]

Surfactant F-554: A perfluoroalkyl group-containing nonionic surfactant (manufactured by DIC Corporation) represented by the following structural formula.

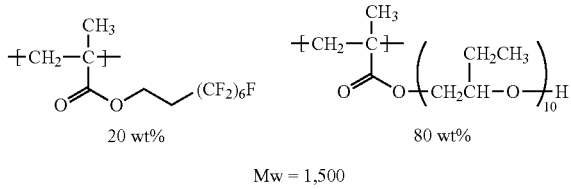

Mw = 1,500

(Formation of Patterning Layer with Different Refractive Indices)

Using a slit coater, the composition C1 was uniformly applied to the glass substrate with a cholesteric layer formed as above, and dried at 80° C. for 60 seconds. Then, exposure was performed via a mask with a line width of 13.3 µm and a line-to-space ratio of 1/5 using an exposing machine PLA-501F (extra high pressure mercury lamp) manufactured by Canon Inc. After the exposure, the composition C1 was developed with an alkali developer (0.4 mass % tetramethylammonium hydroxide aqueous solution) at 23° C. for 60 seconds, and then rinsed with ultrapure water for 20 seconds. After that, a post-baking heat treatment was performed at 200° C. for 30 minutes. A finished layer C1 (first region) had a thickness of 0.71 µm, a line width of 13.3 µm, and a refractive index of 1.50.

A composition C2 was similarly applied to the substrate in which the first region obtained as above was formed. The mask position was adjusted by shifting by 1 pitch and exposure was performed using a similar exposing machine such that the composition C2 remained next to the first region. After the exposure, the composition C2 was developed with an alkali developer (0.4 mass % tetramethylammonium hydroxide aqueous solution) at 23° C. for 60 seconds, and then rinsed with ultrapure water for 20 seconds. After that, a post-baking heat treatment was performed at 200° C. for 30 minutes. A finished layer C2 (second region) had a thickness of 0.71 µm, a line width of 13.3 µm, and a refractive index of 1.57.

Similarly, while the compositions C3 to C6 were shifted by 1 pitch in order, application, exposure, development, and baking were repeated. Accordingly, an absolute phase adjustment layer in which layers each having a film thickness of 0.71 µm, a line width of 13.3 µm, and a refractive index of 1.50 (layer C1: first region), 1.57 (layer C2: second region), 1.64 (layer C3: third region), 1.71 (layer C4: fourth region), 1.78 (layer C5: fifth region), or 1.85 (layer C6: sixth region) were set as one unit and continuously arranged was obtained.

In this manner, an optical laminate of Example 1, in which the absolute phase adjustment layer was laminated and formed on the reflection layer (wavelength selective reflective element) formed of the cholesteric liquid crystal layer, was obtained.

Example 2

(Preparations of Refractive Index Layer Forming Compositions C7 to C11)

Materials were mixed with the composition (parts by mass) shown in Table 2, and thus a homogeneous solution was prepared. Then, the solution was filtered using a polyethylene filter having a pore size of 0.2 µm to prepare refractive index layer forming compositions C7 to C11.

TABLE 2

|  | C7 | C8 | C9 | C10 | C11 |
|---|---|---|---|---|---|
| PGMEA | 100 | 100 | 100 | 100 | 100 |
| Polymer E1 | 100.5 | 200.9 | 301.4 | 401.9 | 502.3 |
| Photo Acid Generator | 5.1 | 5.1 | 5.1 | 5.1 | 5.1 |
| Photosensitizer | 5.1 | 5.1 | 5.1 | 5.1 | 5.1 |
| Base | 0.2 | 0.2 | 0.2 | 0.2 | 0.2 |
| Surfactant | 0.2 | 0.2 | 0.2 | 0.2 | 0.2 |

As in Example 1, the composition C7 was uniformly applied to the cholesteric liquid crystal layer formed on the glass substrate using a slit coater, and dried at 80° C. for 60 seconds. Then, exposure was performed via a mask with a line width of 13.3 µm and a line-to-space ratio of 1/5 using an exposing machine PLA-501F (extra high pressure mercury lamp) manufactured by Canon Inc. After the exposure, the composition C7 was developed with an alkali developer (0.4 mass % tetramethylammonium hydroxide aqueous solution) at 23° C. for 60 seconds, and then rinsed with ultrapure water for 20 seconds. After that, a post-baking heat treatment was performed at 200° C. for 30 minutes. A finished layer C7 (second region) had a thickness of 0.1 µm, a line width of 13.3 µm, and a refractive index of 1.50.

As in Example 1, while the compositions C8 to C11 were shifted by 1 pitch in order, application, exposure, development, and baking were repeated. Accordingly, an optical laminate of Example 2 comprising an absolute phase adjustment layer in which layers each having a refractive index of 1.50, a line width of 13.3 µm, and a film thickness of 0.1 µm (layer C7: second region), 0.2 µm (layer C8: third region), 0.3 µm (layer C9: fourth region), 0.4 µm (layer C10: fifth region), or 0.5 µm (layer C11: sixth region), and a layer (first region) next to the above layers and having no patterning composition were set as one unit and continuously arranged was obtained. The layers C7 to C11 have different film thicknesses, and thus these are formed using compositions C7 to C11 having different matrix (polymer E1) amounts in the respective compositions as shown in Table 2 in order to stabilize the layers during the film formation process. However, the refractive index of 1.5 is common to the layers C7 to C11.

Comparative Example 1

Comparative Example 1 was prepared in which a cholesteric liquid crystal layer was provided on the alignment film of the glass substrate with an alignment film formed in Example 1. That is, Comparative Example 1 is a reflective polarizer formed of a conventional wavelength selective reflective element comprising no absolute phase adjustment layer.

[Evaluation]

For each optical laminate, light was made incident from the surface side of the absolute phase adjustment layer from a direction normal to the surface (polar angle: 0°), and a reflection angle of the reflected light of the light was measured.

In the measurement of a reflection angle, laser light having a central wavelength of output at 532 nm was made incident at a distance of 50 cm from a direction normal to the surface, and a spot of the reflected light of the laser light was taken with a screen disposed at a distance of 50 cm to calculate the reflection angle.

Table 3 collectively shows the configurations and evaluation results of the examples.

TABLE 3

| Structure of Optical Laminate | Reflective Element | | | Comparative Example 1<br>Cholesteric Layer ($\lambda c$ = 532 nm, 8 pitch) | Example 1<br>Cholesteric Layer ($\lambda c$ = 532 nm, 8 pitch) | Example 2<br>Cholesteric Layer ($\lambda c$ = 532 nm, 8 pitch) |
|---|---|---|---|---|---|---|
| | Absolute Phase Adjustment Layer | | Width of Region [μm] | — | 13.3 | 13.3 |
| | | First Region $A_1$ | Refractive Index $n_1$ | — | 1.50 | 1 |
| | | | Film Thickness $d_1$ [μm] | — | 0.71 | None (air layer) |
| | | Second Region $A_2$ | Refractive Index $n_2$ | — | 1.57 | 1.5 |
| | | | Film Thickness $d_2$ [μm] | — | 0.71 | 0.1 |
| | | Third Region $A_3$ | Refractive Index $n_3$ | — | 1.64 | 1.5 |
| | | | Film Thickness $d_3$ [μm] | — | 0.71 | 0.2 |
| | | Fourth Region $A_4$ | Refractive Index $n_4$ | — | 1.71 | 1.5 |
| | | | Film Thickness $d_4$ [μm] | — | 0.71 | 0.3 |
| | | Fifth Region $A_5$ | Refractive Index $n_5$ | — | 1.78 | 1.5 |
| | | | Film Thickness $d_5$ [μm] | — | 0.71 | 0.4 |
| | | Sixth Region $A_6$ | Refractive Index $n_6$ | — | 1.85 | 1.5 |
| | | | Film Thickness $d_6$ [μm] | — | 0.71 | 0.5 |
| Effect | Reflection Angle with respect to Incident Light Angle of 0° | | | 0° | 0.45° | 0.45° |

As shown in Table 3, in Comparative Example 1 comprising no absolute phase adjustment layer, incident light in a specific wavelength region and specific circularly polarized light are specularly reflected. As in Examples 1 and 2, in a case where an absolute phase adjustment layer in which first to sixth regions having different optical path lengths were arranged in a pattern was provided, the reflection angle was 0.45°, and the reflected light was not reflected specularly, but emitted in an oblique direction.

Example 11

An optical laminate comprising a reflection layer formed of a dielectric multilayer film D1 as a wavelength selective reflective element was formed. The wavelength selective reflective element was formed with reference to JP1999-508378A (JP-H11-508378A). Details thereof will be described below.

(Dielectric Multilayer Film D1)

Two types of aligned birefringent polymer layers were alternately laminated and biaxially stretched such that the in-plane refractive index differed between the two types of layers, and thus the dielectric multilayer film D1 was formed. The thickness of the dielectric multilayer film was set such that the optical path length, obtained by multiplying the thickness of each of the two types of aligned refractive index polymer layers by the refractive index of each of the layers, was equal to one quarter of a desired reflection wavelength (here, 532 nm). In the method of forming a dielectric multilayer film described in JP1999-508378A (JP-H11-508378A), uniaxial stretching was performed, but in this example, biaxial stretching was performed, and the refractive index of each layer was set to have no in-plane anisotropy. Of the two types of aligned refractive index polymers, the low refractive index layer had a refractive index set to 1.64, and the high refractive index layer had a refractive index set to 1.88. The thickness of the low refractive index layer was set to 81.1 nm, and the thickness of the high refractive index layer was set to 70.7 nm in order to allow the dielectric multilayer film to function as a reflection layer selectively reflecting a wavelength region having a central wavelength of 532 nm, and a film formed of a total of 256 layers was formed by alternately laminating 128 low refractive index layers and 128 high refractive index layers. In this manner, a reflection layer formed of the dielectric multilayer film D1 having a central wavelength of reflection of 532 nm and having a specific selective reflection region was formed. The half-width of the selective reflection region was about 80 nm.

(Absolute Phase Adjustment Layer)

An absolute phase adjustment layer was formed on the dielectric multilayer film D1 by the same forming method as in Example 1. That is, as in Example 1, an absolute phase adjustment layer having a pattern configuration in which first to sixth regions formed using refractive index layer forming compositions C1 to C6 were periodically arranged was formed.

In this manner, the optical laminate of Example 11 was obtained in which the absolute phase adjustment layer was laminated and formed on the reflection layer (wavelength selective reflective element) formed of the dielectric multilayer film D1.

Example 12

A reflection layer formed of a dielectric multilayer film D1 was formed in the same manner as in Example 11. An absolute phase adjustment layer was formed on the dielectric multilayer film D1 by the same forming method as in Example 2. That is, as in Example 2, an absolute phase adjustment layer having a pattern configuration in which first to sixth regions formed using refractive index layer forming compositions C7 to C11 were periodically arranged was formed.

In this manner, the optical laminate of Example 12 was obtained in which the absolute phase adjustment layer was formed on the reflection layer formed of the dielectric multilayer film D1.

Example 13

An optical laminate comprising a reflection layer formed of a dielectric multilayer film D2 as a wavelength selective reflective element was formed.

(Dielectric Multilayer Film D2)

The dielectric multilayer film D2 is formed by alternately laminating two types of aligned birefringent polymer layers. In this case, the thickness of the dielectric multilayer film was set such that the refractive indices of the two types of aligned refractive index polymer layers were substantially the same in one in-plane direction (for example, x-axis), and were different from each other in a direction (for example, y-axis) orthogonal to the one-in-plane direction, and the optical path length, obtained by multiplying the thickness of each of the two types of aligned refractive index polymer layers by the refractive index in the y-axis direction, was equal to one quarter of a desired reflection wavelength (here, 532 nm). In this example, a configuration similar to those of FIGS. 1 and 2 of JP1999-508378A (JP-H11-508378A), in which specific linearly polarized light was selectively polarized and reflected was provided by uniaxial stretching according to the method of forming a dielectric multilayer film described in JP1999-508378A (JP-H11-508378A). The thickness of the low refractive index layer was set to 81.1 nm, and the thickness of the high refractive index layer was set to 70.7 nm in order to allow the dielectric multilayer film to function as a reflection layer selectively reflecting a wavelength region having a central wavelength of 532 nm, and a film formed of a total of 256 layers was formed by alternately laminating 128 low refractive index layers and 128 high refractive index layers. In this manner, a reflection layer formed of the dielectric multilayer film D2 having a central wavelength of reflection of 550 nm, having a specific selective reflection region, and reflecting specific linearly polarized light was formed. The half-width was about 80 nm.

(Absolute Phase Adjustment Layer)

An absolute phase adjustment layer was formed on the dielectric multilayer film D2 by the same forming method as in Example 1. That is, as in Example 1, an absolute phase adjustment layer having a pattern configuration in which first to sixth regions formed using refractive index layer forming compositions C1 to C6 were periodically arranged was formed.

In this manner, the optical laminate of Example 13 was obtained in which the absolute phase adjustment layer was laminated and formed on the reflection layer (wavelength selective reflective element) formed of the dielectric multilayer film D2.

Comparative Example 11

A wavelength selective reflective element formed of a dielectric multilayer film D1 formed in Example 11 was provided as Comparative Example 11. That is, Comparative Example 11 is formed only of the wavelength selective reflective element without comprising an absolute phase adjustment layer.

Regarding Examples 11 to 14 and Comparative Example 11, evaluation was performed in the same manner as in Example 1. Table 4 collectively shows the configurations and evaluation results of the examples.

TABLE 4

| | | | Comparative Example 11 | Example 11 | Example 12 | Example 13 |
|---|---|---|---|---|---|---|
| Structure of Optical Laminate | Reflective Element | | Dielectric Multilayer Film D1 | Dielectric Multilayer Film D1 | Dielectric Multilayer Film D1 | Dielectric Multilayer Film D2 |
| | Absolute Phase Adjustment Layer | Width of Region [μm] | — | 13.3 | 13.3 | 13.3 |
| | | First Region $A_1$ Refractive Index $n_1$ | — | 1 | 1 | 1.50 |
| | | Film Thickness $d_1$ [μm] | — | 0.71 | None (air layer) | 0.71 |
| | | Second Region $A_2$ Refractive Index $n_2$ | — | 1.57 | 1.5 | 1.57 |
| | | Film Thickness $d_2$ [μm] | — | 0.71 | 0.1 | 0.71 |
| | | Third Region $A_3$ Refractive Index $n_3$ | — | 1.64 | 1.5 | 1.64 |
| | | Film Thickness $d_3$ [μm] | — | 0.71 | 0.2 | 0.71 |
| | | Fourth Region $A_4$ Refractive Index $n_4$ | — | 1.71 | 1.5 | 1.71 |
| | | Film Thickness $d_4$ [μm] | — | 0.71 | 0.3 | 0.71 |

TABLE 4-continued

|  |  | Comparative Example 11 | Example 11 | Example 12 | Example 13 |
|---|---|---|---|---|---|
| Fifth Region $A_5$ | Refractive Index $n_5$ | — | 1.78 | 1.5 | 1.78 |
|  | Film Thickness $d_5$ [μm] | — | 0.71 | 0.4 | 0.71 |
| Sixth Region $A_6$ | Refractive Index $n_6$ | — | 1.85 | 1.5 | 1.85 |
|  | Film Thickness $d_6$ [μm] | — | 0.71 | 0.5 | 0.71 |
| Effect | Reflection Angle with respect to Incident Light Angle of 0° | 0° | 0.45° | 0.45° | 0.45° |

As shown in Table 4, in Comparative Example 11 comprising no absolute phase adjustment layer, light in a specific wavelength region of incident light is specularly reflected. As in Examples 11 to 13, in a case where an absolute phase adjustment layer in which first to sixth regions having different optical path lengths were arranged in a pattern was provided, the reflection angle was 0.45°, and the reflected light was not reflected specularly, but emitted in an oblique direction. The optical laminates of Examples 11 and 12 having no polarization reflection properties, and the optical laminate of Example 13 selectively reflecting specific linearly polarized light also obtained the same effect.

EXPLANATION OF REFERENCES 10, 10A, 10B, 10C, 110: optical laminate
12: wavelength selective reflective element (cholesteric liquid crystal layer)
14: absolute phase adjustment layer
112: wavelength selective reflective element (dielectric multilayer film)
$A_1$ to $A_6$, $S_1$ to $S_6$: region
n, $n_1$ to $n_6$: refractive index
d, $d_1$ to $d_6$: film thickness
L, $L_1$ to $L_6$: optical path length
I: incident light
R: reflected light

What is claimed is:

1. An optical laminate comprising:
a wavelength selective reflective element which is provided with a reflection layer selectively reflecting light in a specific reflection wavelength region; and
an absolute phase adjustment layer which is provided on at least one surface side of the wavelength selective reflective element and has optical isotropy,
wherein the absolute phase adjustment layer has a uniform film thickness, and has an in-plane distribution of a refractive index, and thus has an in-plane distribution of an optical path length in a film thickness direction, and
wherein the optical laminate reflects light in the specific reflection wavelength region by the wavelength selective reflective element, of light incident from the absolute phase adjustment layer side, as reflected light having a wavefront different from a wavefront of the incident light.

2. The optical laminate according to claim 1, wherein the reflection layer of the wavelength selective reflective element is formed of a cholesteric liquid crystal layer.

3. The optical laminate according to claim 1, wherein the reflection layer of the wavelength selective reflective element is formed of a dielectric multilayer film in which at least two layers having different refractive indices are alternately laminated in multiple layers.

4. The optical laminate according to claim 1, wherein the in-plane distribution of the optical path length has a pattern in which the optical path length is changed stepwise.

5. The optical laminate according to claim 1, wherein the in-plane distribution of the optical path length has a pattern in which the optical path length is gradually increased with an increase in distance from one point.

6. The optical laminate according to claim 1, wherein the in-plane distribution of the optical path length has a pattern in which the optical path length is gradually reduced with an increase in distance from one point.

7. The optical laminate according to claim 4, wherein the pattern is periodically repeated.

8. The optical laminate according to claim 5, wherein the pattern is periodically repeated.

9. The optical laminate according to claim 6, wherein the pattern is periodically repeated.

10. An optical laminate comprising:
a wavelength selective reflective element which is provided with a reflection layer selectively reflecting light in a specific reflection wavelength region; and
an absolute phase adjustment layer which is provided on at least one surface side of the wavelength selective reflective element and has optical isotropy,
wherein the wavelength selective reflective element is flat,
wherein the absolute phase adjustment layer has an in-plane distribution of at least one of a refractive index or a film thickness, and thus has an in-plane distribution of an optical path length in a film thickness direction, and
wherein the optical laminate reflects light in the specific reflection wavelength region by the wavelength selective reflective element, of light incident from the absolute phase adjustment layer side, as reflected light having a wavefront different from a wavefront of the incident light.

* * * * *